United States Patent [19]

Allen

[11] Patent Number: 5,790,473
[45] Date of Patent: *Aug. 4, 1998

[54] HIGH FIDELITY VIBRATORY SOURCE SEISMIC METHOD FOR USE IN VERTICAL SEISMIC PROFILE DATA GATHERING WITH A PLURALITY OF VIBRATORY SEISMIC ENERGY SOURCES

[75] Inventor: Kenneth Paul Allen, Dallas, Tex.

[73] Assignee: Mobil Oil Corporation, Fairfax, Va.

[ * ] Notice: The term of this patent shall not extend beyond the expiration date of Pat. No. 5,550,786.

[21] Appl. No.: 555,656

[22] Filed: Nov. 13, 1995

[51] Int. Cl.⁶ .................................. G01V 1/24; G01V 1/36
[52] U.S. Cl. .................. 367/57; 367/48; 367/41; 181/111
[58] Field of Search .................... 181/107, 111; 367/21, 38, 41, 57, 48, 49, 189, 43

[56] References Cited

U.S. PATENT DOCUMENTS

| | | | |
|---|---|---|---|
| 4,184,144 | 1/1980 | Rickenbacker | 367/137 |
| 4,545,039 | 10/1985 | Savit | 367/39 |
| 4,627,036 | 12/1986 | Wyatt | 367/57 |
| 4,646,274 | 2/1987 | Martinez | 367/46 |
| 4,675,851 | 6/1987 | Savit et al. | 367/41 |
| 4,707,812 | 11/1987 | Martinez | 367/46 |
| 4,715,020 | 12/1987 | Landrum, Jr. | 367/38 |
| 4,755,976 | 7/1988 | Edelmann | 367/189 |
| 4,794,573 | 12/1988 | Bell et al. | 367/57 |
| 4,823,326 | 4/1989 | Ward | 367/41 |
| 4,982,374 | 1/1991 | Edington et al. | 367/48 |
| 5,173,879 | 12/1992 | Cung et al. | 367/46 |
| 5,400,299 | 3/1995 | Trantham | 367/38 |
| 5,550,786 | 8/1996 | Allen | 367/48 |

OTHER PUBLICATIONS

Newman, "Inverse Operator: In the Quest of Pure Source Signature," 58th Ann. Soc. Explor. Geophy. Int. mtg. (Anaheim, Calif.), Oct. 1988.

*Primary Examiner*—Ian J. Lobo
*Attorney, Agent, or Firm*—Robert B. Furr, Jr.; Malcolm D. Keen

[57] ABSTRACT

A method for recording and pre-processing vertical seismic profile high fidelity vibratory seismic data includes the steps of measuring the motion of the vibrator which is related to the vibrator applied force times a transfer function of minimum phase, causal, linear system relating the actual vibrator output with the measured vibrator motion, separating signals according to the generating source of each, determining a ratio by dividing the vibratory seismic data by the measured motion of the vibrator to remove the unknown applied force leaving the earth reflectivity times a time derivative divided by a minimum phase function, minimum phase band pass filtering the resulting ratio and performing minimum phase deconvolution to remove the time derivative divided by the transfer function of minimum phase.

13 Claims, 3 Drawing Sheets

HIGH FIDELITY VIBRATORY SOURCE SEISMIC METHOD FOR USE IN VERTICAL SEISMIC PROFILE DATA GATHERING WITH A PLURALITY OF VIBRATORY SEISMIC ENERGY SOURCES

BACKGROUND OF THE INVENTION

1. Field of the Invention

The present invention pertains to vertical seismic profile data acquisition and processing and more particularly to a pre-processing vertical seismic profile data method in which data generated by multiple vibrating sources is received and prepared for high resolution or high fidelity data processing.

2. Related Prior Art

In vertical seismic profile data, it is conventional practice to use a single seismic source to apply a force to the ground in the proximity of a wellbore. The subsequent motion caused by the application of this force is measured at various locations within the wellbore. This is done by energizing the seismic source and detecting the downgoing wave and upcoming or reflected wave at a first receiver location in the wellbore. The receiver is then moved several feet along the length of the wellbore and the source is energized again. The downgoing and upcoming seismic waves are again measured. This procedure is repeated periodically through selected lengths of the well that constitute zones of interest. By controlling the duration and frequency of the force, a broad band signal with sufficient energy is achieved. By using the receiver motions and segregating the downgoing and reflected waves a seismogram is constructed, usually by correlation, or inversion in the frequency domain, with the signal representing the downgoing wave. From this procedure properties of the impedance function of the earth can be calculated.

SUMMARY OF THE INVENTION

The present invention provides a method for generating, recording and preprocessing high resolution vibratory source data for use in vertical seismic profile technology. The method of the present invention includes measuring the motion or motions of the vibrators. These motions are related to the actual vibrator applied force by a transfer function of a minimum phase, causal, linear system and are used to separate received signals. These signals are used in an inversion operation to process the received data. The system of the present invention relates the actual vibrator output with the measured vibrator motion or motions. The vibrators are energized with a predetermined pattern. This pattern is used to separate the received data according to the source used to generate the detector motion or motions. The received data may then be processed to isolate the downgoing waves for each vibratory source. The separated data may then be processed by conventional correlation using the downgoing wave data to produce a seismogram. In the alternative, a ratio may be determined by dividing the vibratory seismic data by the measured motion or motions of each of the vibrators to remove the unknown applied force leaving the earth reflectivity times a time derivative, divided by a minimum phase function. Minimum phase deconvolution is performed to remove the time derivative divided by the transfer function of minimum phase.

DESCRIPTION OF THE PREFERRED EMBODIMENT

Figure 1:
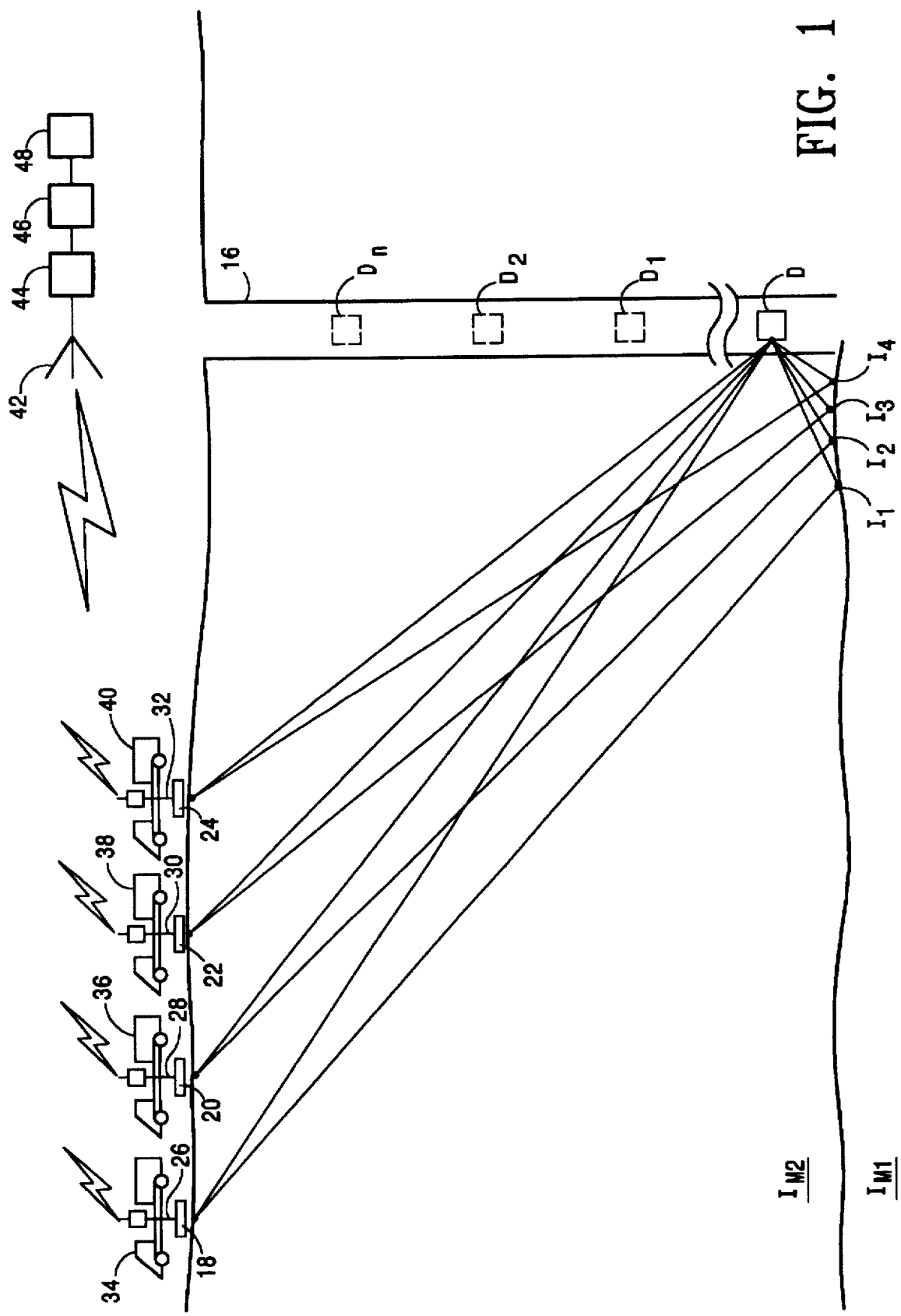
FIG. 1 is a drawing of a typical vertical seismic profile data gathering technique.

In the present invention, multiple seismic sources are used. Each of these sources is a vibratory source in which a signal directly related to the actual signal that the vibrator is sending into the ground is used in pre-processing. These signals are reflected by interfaces separating formations having different impedances. The reflected signals produce motion or motions detected by a seismic receiver, such as a geophone, located within a wellbore. This seismic receiver is positioned at one point in the wellbore, vibratory motions are generated by sources and detected by the receiver. The receiver is moved a predetermined distance to a different location in the well and the process is repeated.

In order to construct a seismogram, a determination of which source was responsible for the detected motions of the receiver must be made. Each source has unique characteristics that aids in isolating the source that generated the force which caused the receiver motions, since the data received will vary for each source. Processing with the estimate of one source on data generated by another source will produce an inaccurate seismogram. In order to increase the accuracy in producing a seismogram, the data must be separated according to its generating source for further processing with the force from its corresponding source.

In a first embodiment of the present invention, the data is separated according to the source which generated it. From this point, the downgoing wave may be isolated and the data may be further processed as typical data by any one of the well known methods for processing vertical seismic profile data.

In a second embodiment of the present invention, the vibrator motion or motions are measured to provide a signal that is used to process the data by eliminating an unknown. The data is divided by a minimum phase relative of the actual transmitted signal in the frequency domain, which removes the actual transmitted signal from the determination. When solving for the earth reflectivity, detected data, which is the time derivative of the transmitted vibrator ground force multiplied by the earth's reflectivity, is divided by a quantity equal to the vibrator ground force multiplied by a transfer function of minimum phase. By doing this, the vibrator force is removed from the data. This leaves the earth reflectivity multiplied by a time derivative divided by a minimum phase transfer function, which ratio is then removed by minimum phase deconvolution.

In gathering seismic data using seismic acoustic energy, ground vibrations from a vibratory source may be used by placing a large mass in contact with the ground. A simple vibrator may be used in the present invention. Typically a force is applied by reversing hydraulic flow in a chamber in a reaction mass that is suspended by a piston and rod assembly attached to a stilt structure at a cross member.

Typically, the reaction mass motion is measured by mounting accelerometers on the reaction mass itself. The motion of a baseplate, which is actually coupled to the ground, is measured by accelerometers mounted on the stilt structure cross member. In the present invention, pairs of accelerometers are used in each position so that the outputs may be compared and a determination may be made whether the signal generated is suitable for use in further processing.

FIG. 1 is a system diagram illustrating the data gathering process of the present invention. A wellbore 16 is illustrated as located a distance from vibrators 18, 20, 22 and 24 with two pairs of accelerometers 26, 28, 30 and 32, as described above, located on trucks 34, 36, 38 and 40, respectively. The signals are transmitted via radio link 42 to master vibrator memory 44 where they are checked to determine their reliability and are stored for comparison at a later time.

The signals that are generated into the earth by vibrators 18, 20, 22 and 24 are reflected off the interface between subsurface impedance $Im_1$ and $Im_2$ at various points, $I_1$, $I_2$, . . . etc. along the interface. These reflected signals are detected by a seismic receiver D positioned in wellbore 16. After detection of signals, seismic receiver D is moved a predetermined distance uphole, as illustrated in phantom, and vibrators 18, 20, 22 and 24 are re-energized. The generated signals are reflected off the interface between subsurface impedance $Im_1$ and $Im_2$ at various points, $I_1$, $I_2$, . . . etc. along the interface a second time. This procedure is repeated several times to produce the effect of having a vertical string of geophones instead of the traditional horizontal line.

Figure 2:
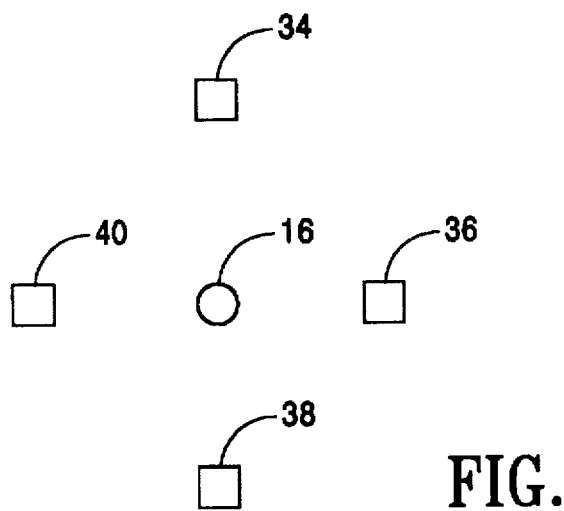
FIG. 2 is a plan view of an alternate arrangement of vibratory sources in the use of the present invention.
Figure 3:
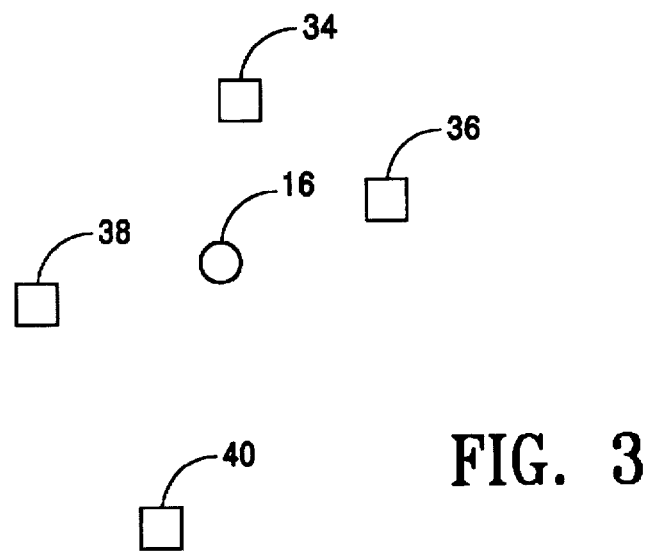
FIG. 3 is a plan view of a second alternate arrangement of vibratory sources in the use of the present invention.

In FIG. 1, the vibratory sources on trucks 34, 36, 38 and 40 are illustrated as being positioned radially in a straight line from borehole 16. FIGS. 2 and 3 illustrate possible alternate arrangements for trucks 34, 36, 38 and 40.

In FIG. 2, the vibratory sources are spaced equally along a circumference defined by a predetermined radius. This radius may be of any practical distance. The spacing of trucks 34, 36, 38 and 40 along the circumference need not be of equal distance but may be spaced so that all the trucks are in the top half of the circle, in one quadrant, etc.

In FIG. 3, trucks 34, 36, 38 and 40 are spaced randomly around borehole 16, at different radii. Trucks 34, 36, 38 and 40 are illustrated as having three in the top half of a circle with borehole 16 as its center. However, any random arrangement is possible as long as the separation of the signals from the vibratory sources is not impaired.

When the signals generated by vibrators 18, 20, 22 and 24 on trucks 34, 36, 38 and 40 are transmitted to mass memory 44, they are conveyed to recorder 46 for transfer to tape 48 for combination with raw seismic data received from seismic receiver D. The received data signals and the raw seismic data stored on a tape 48 can be transferred to computers at other locations.

The measured signals are representative of the actual signals that are generated into the surface of the earth through vibratory source technique. These measured signals are minimum phase relatives of the actual signals that are generated into the earth by this technique. In the present invention, a signal which is minimum phase related to the actual force generated into the earth is measured and taken from the vibrator source directly. Thus, a relative of the actual signal is used in the process.

The present invention takes a different approach than conventional processing for vertical seismic profile data. First, the present invention uses multiple sources and recognizes that the motions measured on the vibrator are related to the actual output force or signal that is put into the ground by a minimum phase transfer function in the frequency domain. Both the minimum phase transfer function and the actual output force are unknown. Second, this embodiment of the present invention performs an inversion operation instead of the correlation process of conventional vertical seismic profile processing.

The detected seismic data is represented in the frequency domain by the product of the time derivative of the actual force with the reflectivity of the earth.

By using inverse filtering through a minimum phase band pass filter, the ratio of the measured seismic motion to the measured motion of the vibrator can be computed. This ratio eliminates the unknown actual output force. A scaling factor is also required to preserve total energy through this inverse filtering process.

The resulting seismogram is represented by the ratio of the measured seismic motion to the measured motion of the vibrator and is the desired answer, the earth reflectivity, convolved with a minimum phase function. A property of minimum phase functions is that their derivative and their reciprocal are also minimum phase. Thus the seismogram can be further processed with minimum phase deconvolution to obtain the impulse response of the earth in the frequency domain. In essence, the ratio of the measured seismic motion to the measured motion of the vibrator seismogram is the band limited impulse seismogram. It is causal and minimum phase related to the earth response.

This method for multiple sources is always correct since the actual and unknown vibratory motion has been eliminated.

Two methods of simultaneous separation are as follows:

| | METHOD 1 | | | |
|---|---|---|---|---|
| SWEEP # | 1 | 2 | 3 | 4 |
| VIBRATOR A (phase) | 0 | 0 | 0 | 0 |
| VIBRATOR B (phase) | 0 | 180 | 0 | 180 |
| VIBRATOR C (phase) | 0 | 0 | 180 | 180 |
| VIBRATOR D (phase) | 0 | 180 | 180 | 0 |

This method avoids a 90 degree problem and only requires that a sweep done at 0 degrees be the mirror image of one done at 180 degrees. However, for effective separation, the system should guarantee that Vibrator A's motions are repeatable in real time.

| | METHOD 2 | | | |
|---|---|---|---|---|
| SWEEP # | 1 | 2 | 3 | 4 |
| VIBRATOR A | OFF | 0 | 0 | 0 |
| VIBRATOR B | 0 | OFF | 0 | 0 |
| VIBRATOR C | 0 | 0 | OFF | 0 |
| VIBRATOR D | 0 | 0 | 0 | OFF |

As in the first method confirmation of the separation assumption needs to be made in real-time. This method produces slightly less signal, three instead of four, but uses the least demanding requirement for separation, namely that the sweeps repeat.

For both of these methods the necessary processing signals can be encoded in a similar fashion and the individual vibrator motions can be extracted. This means that only one signal needs to be telemetered to the recorder for each sweep sequence.

Figure 4:
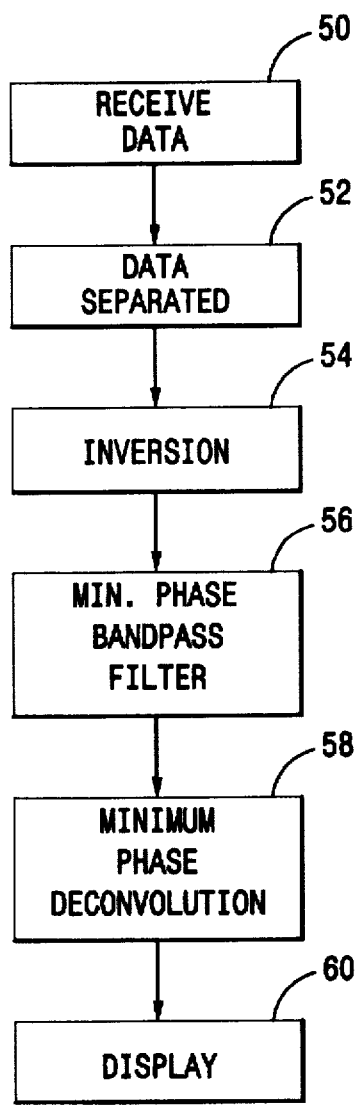
FIG. 4 is a block diagram of a flow chart illustrating a preprocessing method for vertical seismic profile data generated by multiple vibratory sources.

Referring now to FIG. 4 a flow chart of the method of present invention is illustrated in block form. This method may be performed on any digital computer or work station currently in use in the art.

Initially, at block 50 data stored on tape 48 is received. Data received may be of any type of multiple source seismic data generated using vibratory source techniques.

At block 52 the received data is separated. This process begins when the seismic energy responsible for the data is first generated. There are several methods for generating seismic data to permit separation of the detected data which have been discussed previously. Any of the previous methods along with any methods currently in use in the art may be used to separate the received data, however, the preferred embodiment with the phase separation previously described.

At block 54, the inversion process is performed on the received data with the measured signals. This represents a significant difference between the present invention and conventional processing. In conventional processing, the received data is convolved with the downgoing wave signals that are generated into the earth's surface. In the present invention, an inversion process is used which eliminates certain assumptions which have been described previously. The detected data is divided in the frequency domain by the measured signals, which leaves the earth's reflectivity multiplied by a time derivative divided by a minimum phase transfer function.

At block 56 a minimum phase band pass filter is used to band limit the impulse seismogram. The resulting seismogram at this point, or processed detected data after this step, is now represented by the earth's reflectivity convolved with a minimum phase function. It is a property of minimum phase functions that their derivative and their reciprocal are also minimum phase.

In block 58 the seismogram is further processed with minimum phase deconvolution to obtain the impulse response of the earth in the frequency domain. In essence the seismogram resulting after the inversion process and minimum phase band pass filtering is the band limited impulse seismogram. It is causal and minimum phase related to the earth response.

In block 60 the resulting seismogram is displayed. This display may be of any type in use in the art, such as a computer generated sheet, a CRT display etc., as long as impedance changes can be determined.

The method of the present invention for generating, recording and pre-processing high resolution vibratory source vertical seismic profile data has been described which includes the steps of data separation, division of the separated data with measured signals and minimum phase deconvolution. As stated previously, an actual vibrator signal related to what the vibrator is sending into the ground is used in pre-processing. The vibrator motion is measured to provide a signal that is used to process the data. The data is divided by the actual transmitted signal in the frequency domain.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

We claim:

1. A method for processing high resolution vibratory source vertical seismic profile data comprising:

positioning a receiver at one location in a wellbore;

receiving electrical signals representing seismic information generated by multiple vibrators;

receiving measured signals representing transmitted seismic waves from each of said multiple vibrators;

separating said electrical signals corresponding to each of said multiple vibrators;

dividing said separated electrical signals with said measured signals to obtain earth reflectivity multiplied by a time derivative divided by a minimum phase transfer function to obtain a minimum phase data set;

filtering said minimum phase data set with a minimum phase band pass filter; and performing minimum phase deconvolution on said minimum phase data set to obtain earth reflectivity.

2. The method according to claim 1 wherein said separating step includes the step of:

varying the generation sequence of each of said multiple vibrators.

3. The method according to claim 1 wherein said receiving measured signals step includes the steps of:

measuring the seismic signal actually transmitted into the earth's surface; and converting said measured seismic signals into a measured electrical signal.

4. The method according to claim 3 wherein said separating step includes the step of:

varying the generation sequence of each of said multiple vibrators.

5. An apparatus for recording high resolution vibratory source vertical seismic profile data comprising:

means for receiving measured signals representing force generated into the ground by each of a plurality of vibratory sources;

means for receiving electrical signals representing seismic information produced by said force generated into the ground;

means for positioning said means for receiving electrical signals at one position in a wellbore;

separating means for separating said electrical signals according to each of said plurality of vibratory sources;

means for dividing said separated electrical signals with said measured signals to obtain earth reflectivity multiplied by a time derivative divided by a minimum phase transfer function signals;

means for deconvolving said earth reflectivity multiplied by a time derivative divided by a minimum phase transfer function signals;

recording means for recording said summed earth reflectivity multiplied by a time derivative divided by a minimum phase transfer function signals; and display means for displaying said recorded summed earth reflectivity multiplied by a time derivative divided by a minimum phase transfer function signals.

6. The apparatus according to claim 5 wherein said separating means includes:

means for varying the generation sequence of each of said multiple vibrators.

7. The apparatus according to claim 5 wherein said means for receiving measured signals includes:

means for measuring the seismic signal actually transmitted into the earth's surface; and means for converting said measured seismic signals into a measured electrical signal.

8. The apparatus according to claim 7 wherein said means for separating includes:

means for varying the generation sequence of each of said multiple vibrators.

9. A method for recording and pre-processing high fidelity vibratory source vertical seismic profile data signals generated by a plurality of vibratory seismic sources comprising:

positioning a single seismic receiver at one position in a wellbore;

receiving vibratory seismic data signals generated by the plurality of vibratory seismic sources;

measuring the motion of each of the vibratory sources which is related to the vibrator applied force times a transfer function of minimum phase, causal, linear system;

relating actual vibrator output with said measured vibrator motion;

separating said vibratory seismic data signals according to generating source;

determining a ratio by dividing said separated vibratory seismic data signals by said measured motion of each vibratory source to remove the unknown applied force leaving the earth reflectivity times a time derivative divided by a minimum phase function;

minimum phase band pass filtering said resulting ratio; and performing minimum phase deconvolution on said minimum phase band pass filtered ratio to remove the time derivative divided by the transfer function of minimum phase function.

10. A method for processing high resolution vibratory source vertical seismic profile data comprising:

positioning a receiver at one location in a wellbore;

generating seismic energy from a plurality of vibratory sources with a phase associated with each vibrator according to a first sweep in which the phases of the sources are all zero degrees, and a second sweep in which the phases of a first and third vibrator are zero degrees and the phases of a second and fourth vibrator are 180 degrees;

receiving electrical signals representing said seismic energy;

receiving measured signals representing transmitted seismic waves from each of said multiple vibrators;

separating said electrical signals corresponding to each of said multiple vibrators using said measured signals;

isolating downgoing waves in said separated electrical signals; and correlating said separated electrical signals with said downgoing waves to obtain earth reflectivity.

11. The method according to claim 10 wherein said generating seismic energy step further includes:

providing a third sweep in which the phases of the first and second vibrators are zero degrees and the phases of the third and fourth vibrators are 180 degrees, and providing a fourth sweep in which the phases of the first and fourth vibrators are zero degrees and the phases of the second and third vibrators are 180 degrees.

12. The method according to claim 10 wherein said receiving measured signals step includes the steps of:

measuring the seismic signal actually transmitted into the earth's surface; and converting said measured seismic signals into a measured electrical signal.

13. A method for processing high resolution vibratory source vertical seismic profile data comprising the steps of:

positioning a receiver at one location in a wellbore;

generating seismic energy from a plurality of vibrators in multiple sweeps with a phase associated with said seismic energy from each vibrator according to a pattern, said pattern including one vibrator that is turned off and the phases of all of the other of said plurality of vibrators at zero degrees;

receiving electrical signals representing said seismic energy;

receiving measured signals representing transmitted seismic waves from each of said multiple vibrators by measuring the seismic signal actually transmitted into the earth's surface and converting said measured seismic signals into a measured electrical signal;

separating said electrical signals corresponding to each of said multiple vibrators by varying which of said multiple vibrators is turned off in each of said sweeps;

isolating downgoing waves in said separated electrical signals; and correlating said separated electrical signals with said downgoing waves to obtain earth reflectivity.

* * * * *